US008683055B2

(12) United States Patent
Suumäki et al.

(10) Patent No.: US 8,683,055 B2
(45) Date of Patent: Mar. 25, 2014

(54) NETWORK SETUP VIA SHORT-RANGE COMMUNICATION

(75) Inventors: Jan Suumäki, Lempäälä (FI); Guruprasad Kini, Bangalore (IN); Vivek Rajanna, Bangalore (IN)

(73) Assignee: Nokia Corporation, Espoo (FI)

( * ) Notice: Subject to any disclaimer, the term of this patent is extended or adjusted under 35 U.S.C. 154(b) by 12 days.

(21) Appl. No.: 13/335,494

(22) Filed: Dec. 22, 2011

(65) Prior Publication Data

US 2012/0290731 A1    Nov. 15, 2012

(30) Foreign Application Priority Data

Dec. 29, 2010  (IN) .......................... 4004/CHE/2010
Feb. 22, 2011  (IN) ............................. 510/CHE/2011

(51) Int. Cl.
*G06F 15/16*  (2006.01)
(52) U.S. Cl.
USPC ........................................................ 709/228
(58) Field of Classification Search
None
See application file for complete search history.

(56) References Cited

U.S. PATENT DOCUMENTS

| 5,854,901 A * | 12/1998 | Cole et al. ..................... 709/245 |
| 8,457,651 B2 * | 6/2013 | Forutanpour et al. ....... 455/456.1 |
| 2008/0092213 A1 * | 4/2008 | Wei et al. ........................... 726/4 |
| 2009/0257425 A1 * | 10/2009 | Sastry et al. ................... 370/350 |
| 2010/0290446 A1 | 11/2010 | Atreya et al. |
| 2010/0312818 A1 * | 12/2010 | Oman ........................... 709/202 |
| 2011/0208846 A1 | 8/2011 | Ito |
| 2013/0036231 A1 * | 2/2013 | Suumaki ....................... 709/228 |

FOREIGN PATENT DOCUMENTS

| CN | 101895456 | 11/2010 |
| JP | 2010-074610 | 4/2010 |
| JP | 2010-74610 | 4/2010 |
| JP | 2010-093430 | 4/2010 |
| WO | WO2010033377 | 3/2010 |

OTHER PUBLICATIONS

"Wi-Fi Alliance Certifies 200 Products for Wi-Fi Protected Setup Enabling Easy Setup of Consumer Wi-Fi Networks", Feb. 11, 2008, 1 page.
Machine Translation of Japanese Patent Publication No. JP2010-093430—19 pages.

* cited by examiner

*Primary Examiner* — Brian P Whipple
(74) *Attorney, Agent, or Firm* — Locke Lord LLP

(57) ABSTRACT

A system for expediting IP address assignment. An apparatus that desires to initiate a connection with another apparatus may be deemed an initiator (e.g., or a "handover requester" in Near Field Communications, or NFC, terminology). In the instance that an apparatus is deemed to be an initiator, a further determination may be made as to whether the initiator is already a member of a network. If the initiator is determined not to already be a member of a network, the initiator may provide IP address configuration information usable by the other apparatus for assigning an IP address to the initiator. The IP address that is set in the initiator may then be based on an IP address provided to the initiator by the other apparatus in response to the previously sent IP address configuration information.

18 Claims, 9 Drawing Sheets

NETWORK SETUP VIA SHORT-RANGE COMMUNICATION

BACKGROUND

1. Field of Invention

The present invention relates to wireless communication, and in particular, to formation of wireless networks.

2. Background

Wireless-enabled apparatuses may utilize networks when attempting to convey information. For example, an apparatus may initiate a network connection with another device when information is pending for transmission in the apparatus, or in instances when information in other apparatuses is required. The manner in which wireless networks are formed may depend upon the particular wireless communication medium being employed. Apparatuses may initially need to negotiate wireless connections and network membership in order to operate in a network. For example, in the case of wireless local area networking (WLAN), the standard for which has been established in accordance with various sections of IEEE 802.11, an Internet protocol (IP) address may be required so that an individual apparatus within the network may be accessed.

More specifically, IP addresses provide a distinct identification through which the apparatuses participating in the network may interact. Apparatuses that have the same IP address would cause communication conflicts, and so it becomes important that this situation be avoided. The process by which IP addresses are assigned may therefore include measures that help ensure the assignment of unique addresses to new apparatuses being admitted to the network. Example processes may involve the random assignment of an IP address followed by verification that the IP address is not already in use in the network through, for example, an inquiry as to whether the assigned IP address conflicts with the addresses being used by each of the network members.

While these processes may be essential for establishing stable network operation, existing IP address assignment and verification operations may execute over relatively long time periods (e.g., a matter of seconds depending upon the size of a network). The delay caused by such operation may negatively impact the quality of service (QoS) delivered by an apparatus. For example, some applications that rely upon wireless communication may be sensitive to even delays of a few seconds due to, for example, high data integrity requirements, a limited time that an apparatus is within communication range of a information source, the required continuity of streaming data (e.g., audio and/or video), etc., and thus, the overall user experience may suffer.

SUMMARY

Various example embodiments of the present invention may be directed to a method, apparatus, computer program product and system for expediting IP address assignment. An apparatus that desires to initiate a connection with another apparatus may be deemed an initiator (e.g., or a "handover requester" in Near Field Communications, or NFC, terminology). In the instance that an apparatus is deemed to be an initiator, a further determination may be made as to whether the initiator is already a member of a network. If the initiator is determined not to already be a member of a network, the initiator may provide IP address configuration information usable by the other apparatus for assigning an IP address to the initiator. The IP address that is set in the initiator may then be based on an IP address provided to the initiator by the other apparatus in response to the previously sent IP address configuration information.

In at least one example implementation, the IP address configuration information that may be sent from the initiator to the other apparatus may comprise one or more IP address assignment methods supported in the apparatus. This information may be received by the other apparatus, which may send a response to the initiator. For example, the response received by the initiator may comprise at least a selected IP address configuration method (e.g., selected from the one or more IP assignment methods supported in the initiator) and an IP address usable by the initiator for interacting with the other apparatus. In accordance with at least one embodiment of the present invention, the response may further comprise one or more of the IP address of the other apparatus, a subnet mask and an available submask list. This information may be further utilized by the initiator for configuration wireless communications with the other apparatus.

Apparatuses that receive a handover request message may assume the role of the selector (unless a handover request message collision occurs between the apparatuses triggering a collision resolution process). The manner in which IP addresses may be set in a selector may be different than in an initiator. For example, if a selector and an initiator are members of the same existing network, then the selector may ignore any IP address provided by the initiator in a handover request message. On the other hand, a selector that is not already a member of any network may adopt an IP address provided in the handover request message. If a selector and an initiator are both in existing but unrelated networks, then one of the apparatuses must relinquish their existing network membership connection attempt may fail. Regardless of the actual manner in which IP addresses are set, the apparatuses may then interact via wireless communication.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which.

DESCRIPTION OF EXAMPLE EMBODIMENTS

Figure 1A:
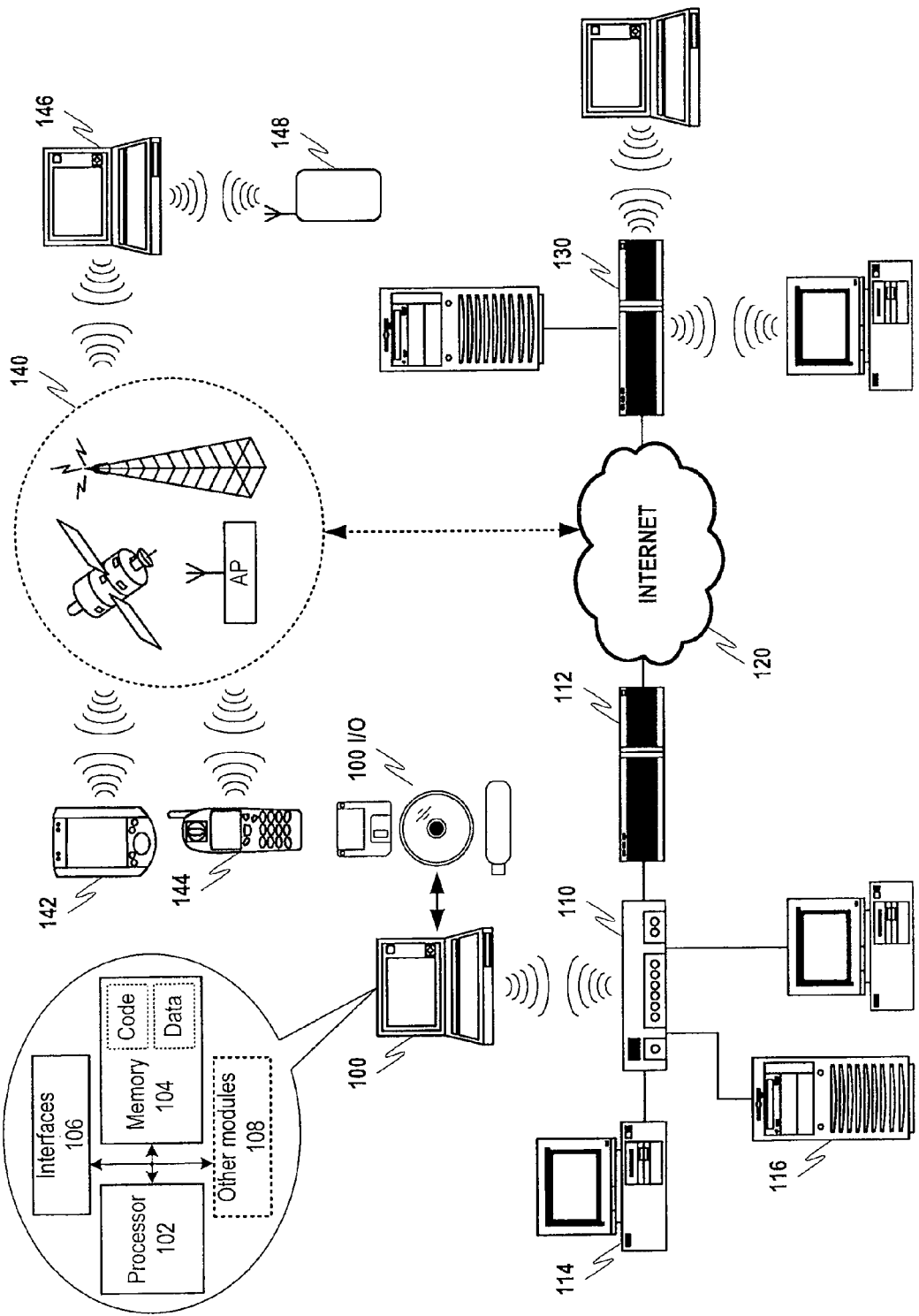
FIG. 1A discloses example apparatuses, systems, configurations, etc. that may be utilized when implementing the various embodiments of the present invention FIG. 1B discloses further detail regarding an example apparatus configuration that may be utilized when implementing the various embodiments of the present invention.

While the invention has been described below in terms of a multitude of example embodiments, various changes can be made therein without departing from the spirit and scope of the invention, as described in the appended claims.

I. Example System with which Embodiments of the Present Invention May be Implemented An example of a system that is usable for implementing various embodiments of the present invention is disclosed in FIG. 1A. The system comprises elements that may be included in, or omitted from, configurations depending, for example, on the requirements of a particular application, and therefore, is not intended to limit present invention in any manner.

Computing device 100 may be, for example, a laptop computer. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 104 in order to obtain stored information (e.g., program code, data, etc.) for use during processing. Memory 104 may generally include removable or embedded memories that operate in a static or dynamic mode. Further, memory 104 may include read only memories (ROM), random access memories (RAM), and rewritable memories such as Flash, EPROM, etc. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.). Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1A. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication. Further, any or all of the disclosed apparatuses may engage in direct interaction, such as in the short-range wireless interaction shown between laptop 146 and wireless-enabled apparatus 148. Example wireless enabled apparatuses 148 may range from more complex standalone wireless-enabled devices to peripheral devices for supporting functionality in apparatuses like laptop 146.

Figure 1B:
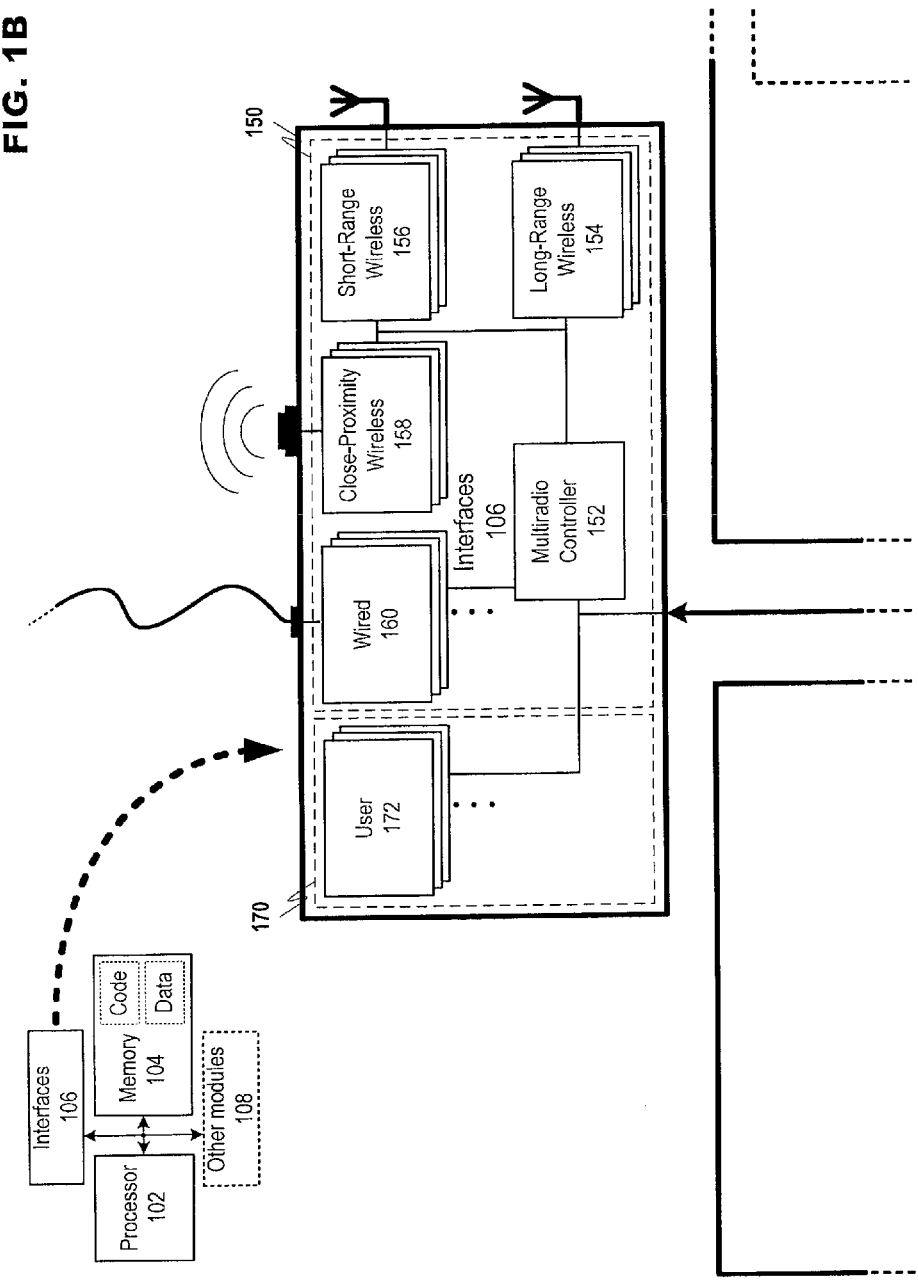

Further detail regarding example interface component 106 disclosed with respect to computing device 100 in FIG. 1A is now discussed regarding FIG. 1B. As previously set forth, interfaces 106 may include interfaces both for communicating data to computing apparatus 100 (e.g., as identified at 150) and other types of interfaces 170 including, for example, user interface 172. A representative group of apparatus-level interfaces is disclosed at 150. For example, multiradio controller 152 may manage the interoperation of long range wireless interfaces 154 (e.g., cellular voice and data networks), short-range wireless interfaces 156 (e.g., Bluetooth and WLAN networks), close-proximity wireless interfaces 158 (e.g., for interactions where electronic, magnetic, electromagnetic and optical information scanners interpret machine-readable data), wired interfaces 160 (e.g., Ethernet), etc. The example interfaces shown in FIG. 1B have been presented only for the sake of explanation herein, and thus, are not intended to limit the various embodiments of the present invention to utilization of any particular interface. Embodiments of the present invention may also utilize interfaces that are not specifically identified in FIG. 1B.

Multiradio controller 152 may manage the operation of some or all of interfaces 154-160. For example, multiradio controller 152 may prevent interfaces that could interfere with each other from operating at the same time by allocating specific time periods during which each interface is permitted to operate. Further, multiradio controller 152 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 152 may interact with interfaces 154-160 in FIG. 1B.

II. Example Address Assignment Systems

This disclosure makes occasional reference to "Wi-Fi" in regard to wireless local area networking (WLAN) based on the various IEEE 802.11 standards, and the various concepts, parameters, variables, etc. related to this type of wireless connectivity. However, the use of this particular form of wireless communication is merely for the sake of explaining various example embodiments of the present invention, and is not meant to limit implementations of the present invention to only the disclosed configuration. For example, various example embodiments of the present invention may also be implemented with other substantially similar wireless mediums.

Continuing with the explanation utilizing the example of Wi-Fi communication, three modes of communication currently exist: Infrastructure (e.g., a basic service set or BSS), Ad Hoc (e.g., Independent Basic Service Set or IBSS) and Wi-Fi Direct (P2P without use of an access point or AP). Infrastructure and Wi-Fi Direct architectures require that a Dynamic Host Configuration Protocol (DHCP) server be available for allocating IP addresses to apparatuses that enter a network. In the instance of Ad Hoc interactions, some implementations may include a DHCP server existing within one of the participating apparatuses, but such configurations are not typical. Another possible solution for assigning IP addresses (e.g., when a DHCP server is not available) may exist in a dynamic configuration of IPv4 link local addresses strategy, or "Auto IP," proposed by the Network Working Group request for comments (RFC) number 3927 published in May 2005 by S. Chesire, et al. Auto IP may allow a network host to automatically configure an interface with an IPv4 address within the 169.254/16 prefix that is valid for communication with other devices connected to the same physical address. However, RFC3927 acknowledges that Link-Local communication using IPv4 addresses is only suitable for communication with other devices connected to the same physical (or logical) link. Moreover, the origin of Auto IP is in fixed networks like Ethernet. It is not optimized for mobile operation.

Figure 2:
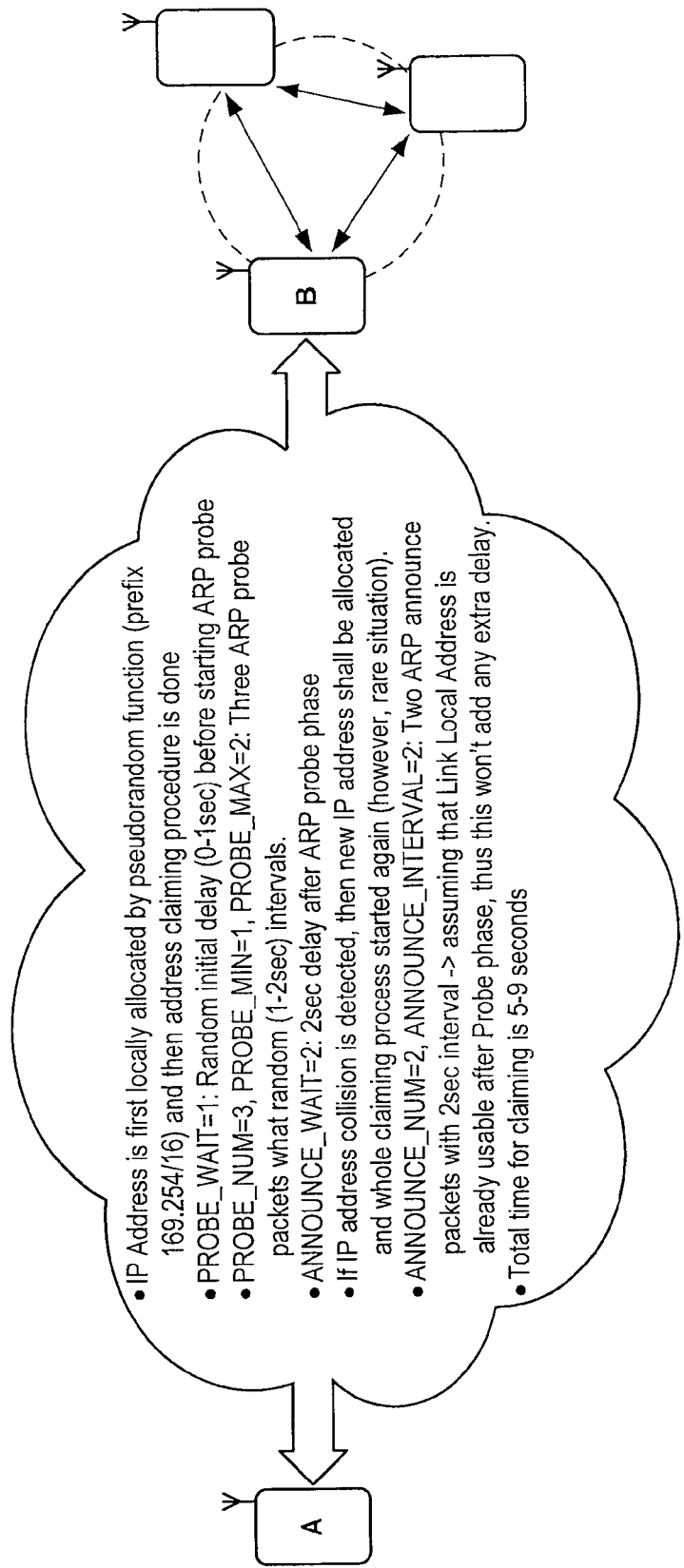
FIG. 2 discloses an example of conventional IP address assignment in accordance with at least one embodiments of the present invention.

A significant problem in implementing mobile wireless networks by assigning IP addresses with Auto IP is that, using the default values defined in RFC3927, the allocation of an IP address (link local address) may take up to 9 seconds. As disclosed in FIG. 2 with respect to the apparatuses shown as "A" and "B," IP addresses are allocated locally using a pseudorandom function (e.g., prefix 169.254/16), and then an address claiming procedure is performed:

PROBE_WAIT=1: Random initial delay (0-1 seconds) before starting ARP probe

PROBE_NUM=3, PROBE_MIN=1, PROBE_MAX=2: Three ARP probe packets what random (1-2 seconds) intervals.

ANNOUNCE_WAIT=2: 2 second delay after ARP probe phase

If IP address collision is detected, then new IP address shall be allocated and whole claiming process started again (however, rare situation).

ANNOUNCE_NUM=2, ANNOUNCE_INTERVAL=2: Two ARP announce packets with 2 second interval->assuming that Link Local Address is already usable after Probe phase, thus this won't add any extra delay.

A typical time of execution for the address claiming process described above is approximately 5-9 seconds. In theory, shortening the RFC3927 default values may be possible in actual implementation, but it is also foreseeable that interoperability issues will result.

In at least one example implementation, Near Field Communication (NFC) may be utilized for exchanging preliminary information required when implementing ad hoc Wi-Fi networks. An example use case may comprise sending a file (e.g., a picture, multimedia, etc.) between apparatuses via "touching." Touching apparatuses may simply comprise positioning an apparatus within NFC communication range (e.g., within radio frequency (RF) transmission range) of another apparatus. The touching may then trigger NFC connection handover including, for example, the exchange of Wi-Fi-related configuration information prior to Wi-Fi connection establishment. If an ad hoc (IBSS) Wi-Fi connection is created for sending only a single file, the delay caused by Auto IP execution may result in an unsatisfactory user experience. In particular, most users expect that sending only one file would take no longer than a few seconds since, in actuality, the throughput typically provided by Wi-Fi communication is so high that transmitting a file, like a picture, may have a total duration of less than one second.

At least one problem in existing touch/handover systems is that touched devices need to know the other apparatus' identity. For example, both the Zero Configuration (IPv4 and IPv6 address autoconfiguration) and UPnP service discovery mechanisms could be used for this purpose, but would add some delay to the overall process. Delay is inherent in both mechanisms since they still rely on the process disclosed in RFC3927, and because both mechanisms would require 'Device Name' to be exchanged via NFC. Alternatively, media access control (MAC) addresses may be exchanged over NFC and then use reverse or inverse address resolution protocol (ARP) to acquire the actual IP address of the device, which would also add some delay.

III. Example Expedited Address Assignment Systems

In accordance with at least one embodiment of the present invention, assigning addressable apparatus identification (e.g., IP addresses) for use within a wireless network may be expedited by having addressable apparatus identification already available when the connection between the apparatuses is being established, eliminating the extra time that would normally be required in order to formulate valid (unconflicted) apparatus identification based on existing assignment methodologies. Apparatuses may also be informed of network identity based on the apparatus identification exchanged during connection establishment (e.g., via NFC), allowing the additional step of acquiring apparatus identity via Wi-Fi to be avoided (e.g., removing the need for a service name query, etc.) and resulting in more time saving in connection establishment.

While the following disclosure discusses the various embodiments of the present invention being applied in the ad hoc (IBSS) mode, the same methodology may be usable with other communication mediums/modes, both known and to be determined. For example, while embodiments of the present invention are discussed in terms of Wi-Fi ad hoc mode operations, the processes described herein may also be useful for supporting person-to-person ("P2P" such as Wi-Fi Direct Mode) interactions if the Wi-Fi alliance were to entertain methods other than DHCP for IP address allocation. In an ideal situation each apparatus would just generate its own random IP address, and then exchange its address with another apparatus when a link is desired. However, this basic operation would not guarantee IP address uniqueness (duplicate IP addresses need to be avoided within the same network connection). Various embodiments of the present invention help ensure IP address uniqueness, regardless of whether only two standalone devices are communicating through touch, or in the a larger IBSS network including other apparatuses.

Figure 3:
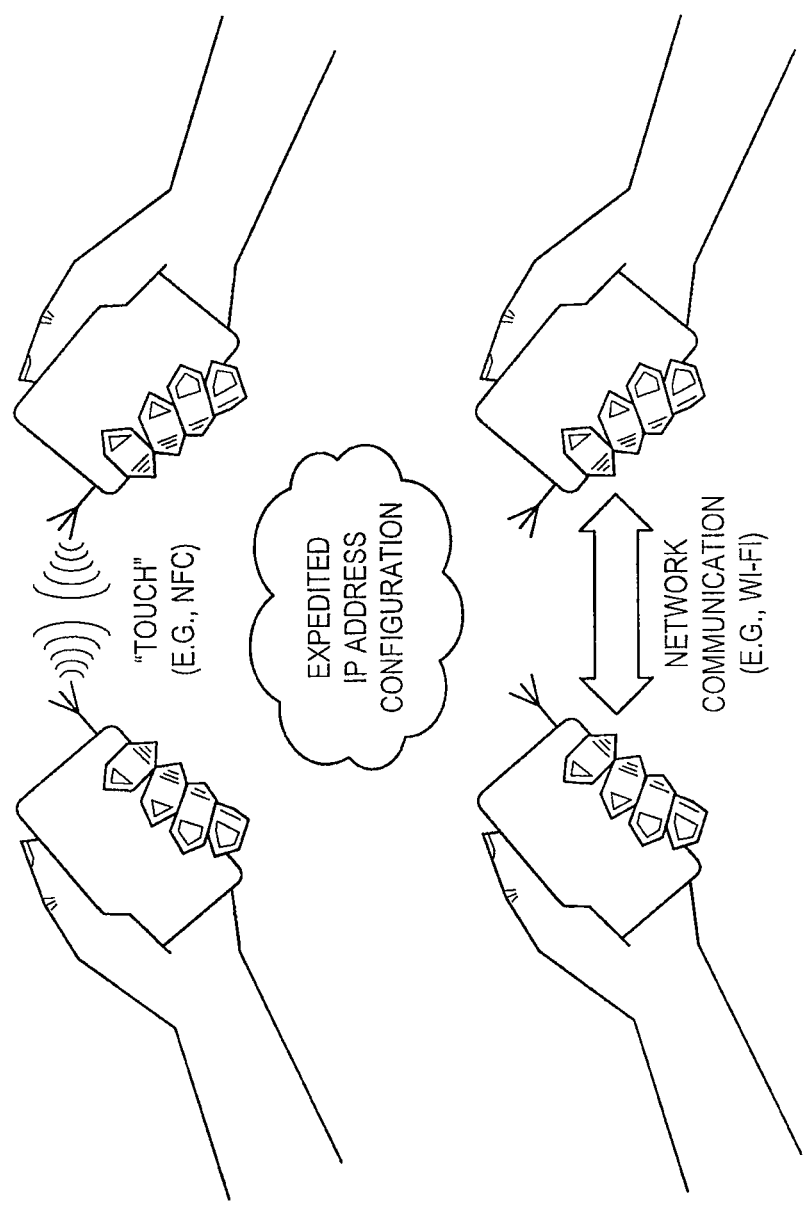
FIG. 3 discloses an general overview of device operation in accordance with at least one embodiment of the present invention.

A generalized example of inventive operation is disclosed in FIG. 3, wherein two apparatuses may be touched to commence the process. Expedited IP address configuration may then be triggered followed subsequently by network interaction (e.g., via Wi-Fi communication).

In accordance with at least one embodiment of the present invention, NFC connection handover messages may be used to exchange IP addresses in the initial touch phase of the communication. Existing connection handover message structure includes an auxiliary data record that may be used to carry additional information related to specific carrier (e.g., Wi-Fi). In terms of Wi-Fi, handover messages include two types of records: a configuration record including actual Wi-Fi configuration information like Service Set Identifier (SSID), password etc., and an auxiliary data record including information like IP addresses or any other data useful for connection handover.

Figure 4:
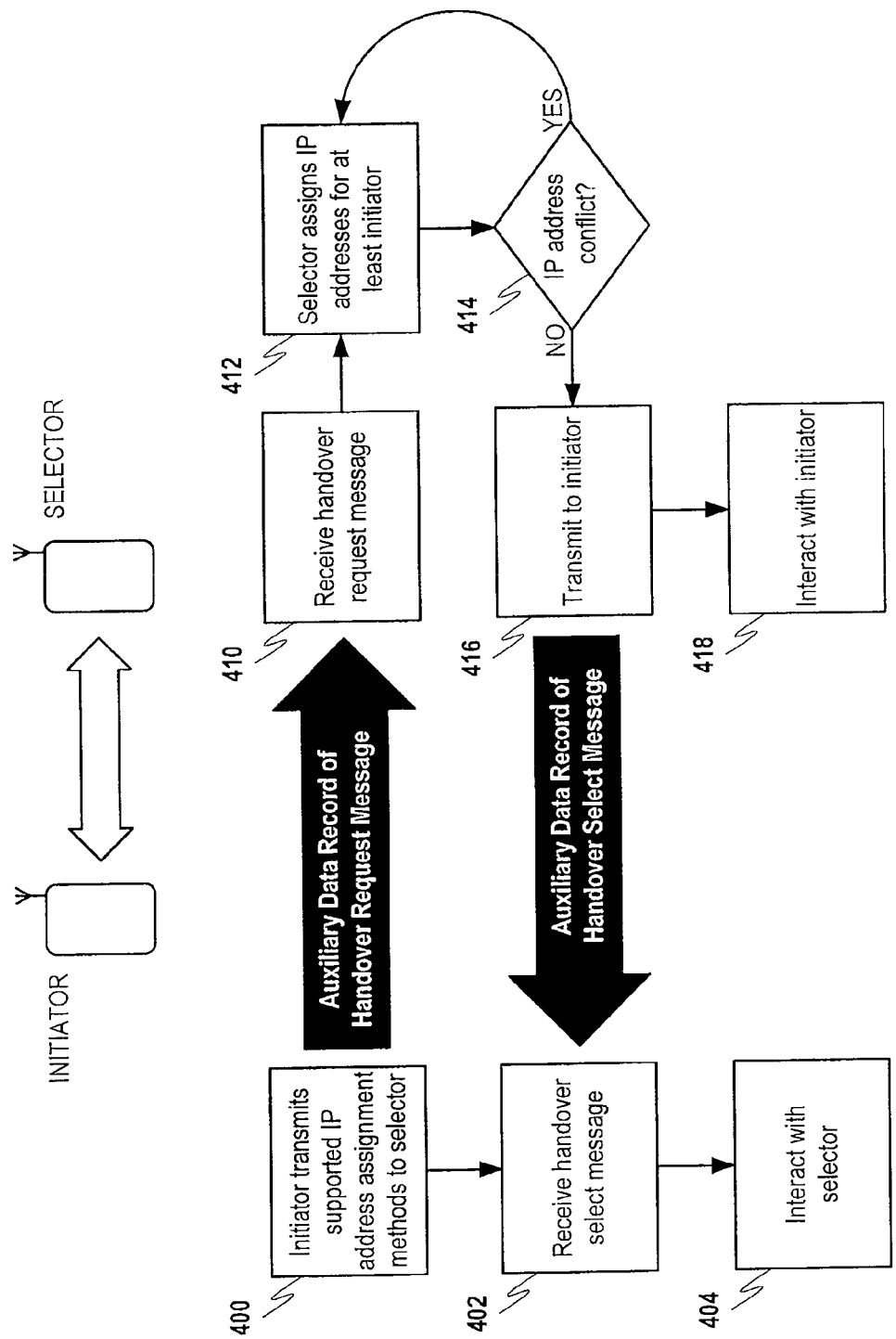
FIG. 4 discloses a first example apparatus interaction scenario in accordance with at least one embodiment of the present invention.
Figure 5:
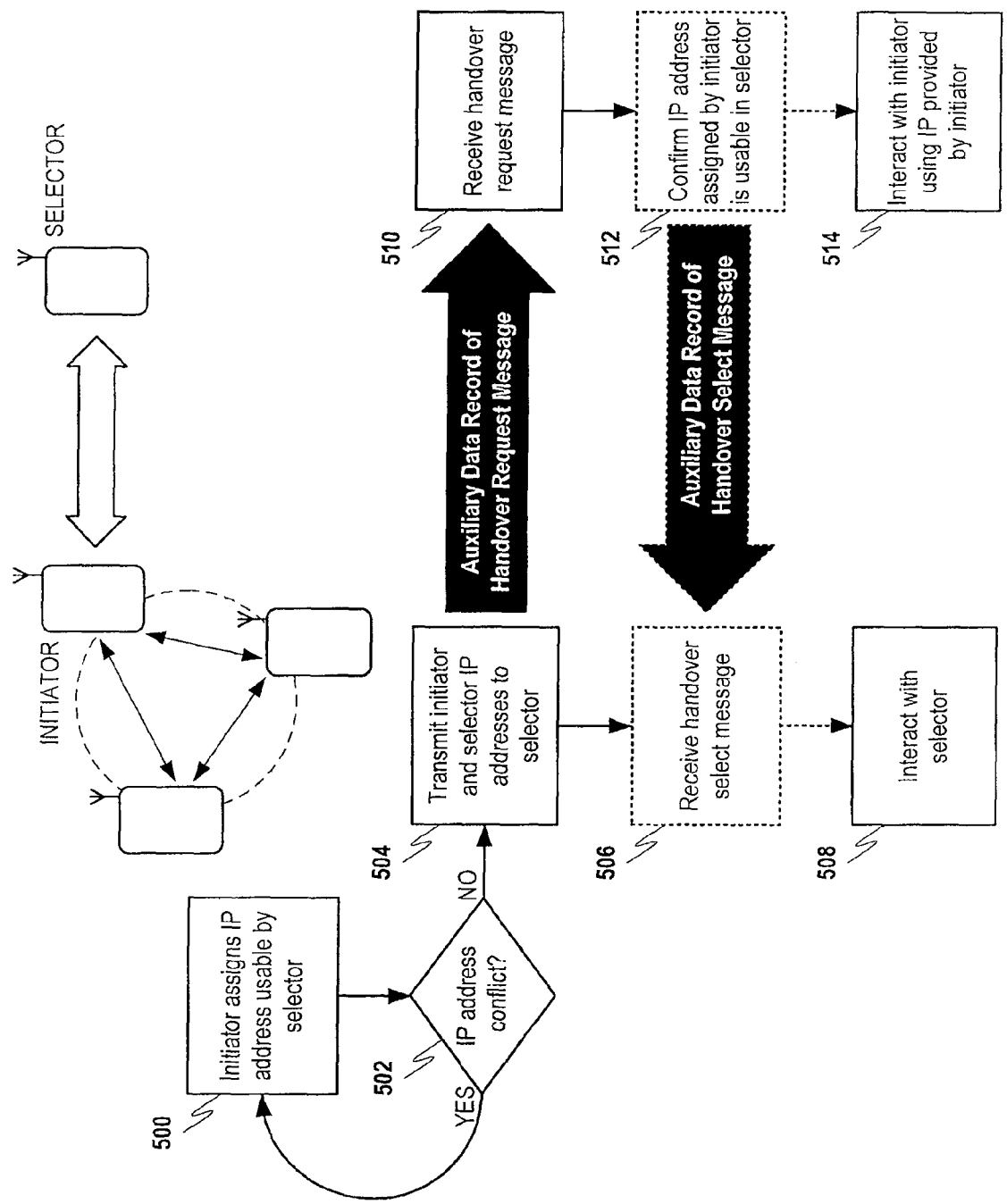
FIG. 5 discloses a second example apparatus interaction scenario in accordance with at least one embodiment of the present invention.

A first example scenario is disclosed in FIG. 4, wherein apparatuses that desire to interact are not members of an existing IBSS network. While these apparatuses are identified as "initiator" and "selector" for the sake of explanation herein, these names are not intended to be limiting, and have been employed merely for the sake of differentiating the actions of each of the apparatuses during connection establishment. For example, in the apparatus interaction shown in FIG. 4 the initiator apparatus may also be deemed a "handover requester" or simply "requester" in accordance with NFC terminology since the apparatus is requesting to establish a link with another apparatus, or an "enrollee" since the selector apparatus may act in a "registrar" capacity for enrolling the initiator into an already existing or new network including the selector.

Either (or both) apparatuses may desire to establish a link to another apparatus in order to transmit or receive information (e.g., such as a picture file per the above example). The device that acts as the initiator may simply be the first apparatus to transmit a handover request message that is acknowledged as received by another apparatus through a responding handover select message. It is also possible for both apparatuses to transmit handover request messages at substantially the same time, resulting in a "collision" of handover requests. For such instances NFC connection handover defines a collision resolution mechanism based on random numbers that results in one of the handover requests being ignored. In the example implementations disclosed in FIG. 4-7, it is assumed that the initiator transmitted the handover request message without experiencing a collision, or if a collision occurred, that the conflict has already been resolved so that the initiator and selector apparatuses are as disclosed.

In step 400 the initiator may transmit supported IP address configuration methods to the selector within, for example, the auxiliary data record of a handover request message. This information may indicate the IP address configuration methods, such as a NFC WSC IPv4 address assignment method, that are supported in the initiating apparatus. In some instances the handover request message may further comprise a media access control (MAC) address.

The selector may receive the handover request message from the initiator in step 410, and in step 412, and may then assign at least an IP address for use by the initiator based on the supported IP address assignment methods provided by the initiator. For example, if the NFC Link Local IPv4 address assignment is selected by the selector from the IP address assignment methods supported by the initiator, then the selector may generate new IP addresses for both the initiator and selector and may check that the generated IP addresses are not the same. Based on variable and fixed portions of IP addresses, in accordance with the example scenario being used for this explanation, the chance that the addresses will be the same are approximately 1/65,000. If the addresses are determined to be the same in step 414, then the process may return to step 412 in order to assign new addresses. Alternatively, if the NFC Wi-Fi Simple Config IPv4 (NFC WSC IPv4) IP address assignment method is selected from the IP address assignment methods supported by the initiator, the selector may use a hierarchical IP address assignment method that is defined in the Wi-Fi Alliance IBSS specification to assign an address to at least the initiator.

The process may then proceed to step 416 where a response transmitted back to the initiator (e.g., in the auxiliary data record of a handover select message). Information that is included in the response may depend on criteria such as a type of IP address assignment method selected. For example, if the NFC Link Local IPv4 address assignment method is selected, then the response may include information indicating the selected IP address assignment method that was selected (e.g., "NFC Link Local IPv4") from the IP address assignment methods supported by the initiator that were transmitted to the selector in step 400 along with the IP addresses that were assigned for the initiator and/or selector. In an alternative example, if the NFC WSC IPv4 address assignment method is selected, the response may further comprise a subnet mask and available submask list. Further to these examples, different IP address assignment methods may require other information in the response. The response may be received by the initiator in step 402 and the initiator may set its IP address based on the information received in the response (e.g., the IP address assigned by the selector). The process may then proceed to step 418 where the selector may interact with the initiator using the newly assigned IP addresses. Likewise, the process on the initiator side may terminate in step 404 wherein the initiator may interact with the selector.

In accordance with an alternative embodiment of the present invention, it is also possible for an initiator currently operating in an existing ad hoc (IBSS) network to interact with a selector that is not a member of any network. An operational scenario including such devices is disclosed with respect to FIG. 5. In step 500 the initiator may assign an IP address for use by the selector while utilizing the IP address that was already assigned for operating as a member of the existing ad hoc network. The initiator may then verify that there is no conflict between the IP address it assigned for the selector and any of the IP addresses that are in use in the existing ad hoc network in step 502. If no conflicts are discovered, the process may proceed to step 504 where both the initiator IP address (e.g., from the existing network) and the IP address assigned for use by the selector may be transmitted to the selector. For example, the IP addresses may be transmitted using the auxiliary data record of a handover request message.

Apparatuses operating in ad hoc networks may be generally aware of the other apparatuses that are also members of the networks (e.g., may be aware of the identification information for the other apparatuses), especially when security is implemented. When using security, there is a direct secure link between each of devices within the ad hoc network. For example, a wireless ad hoc network containing four apparatuses will include six distinct direct links. In view of this awareness within the network, the assignment of random IP addresses and the verification of IP address uniqueness may completed in advance in any or all of the network member apparatuses. Such advanced preparation may increase perceived operating speed during actual interaction. For instance, one or more IP addresses may be prepared prior to apparatus touching and connection handover operations, and uniqueness may be checked using ARP. Alternatively, apparatuses may maintain (accumulate and update) a list of used IP addresses by monitoring traffic within an ad hoc network, and may check that an IP address is not already in use within network by simply assigning a random IP address and comparing the random IP address to the list of known used IP addresses. In step 510 the selector may receive the handover request message and optionally may confirm that the IP address that was assigned by the initiator is usable by transmitting a confirmation in, for example, a handover select message. When the optional confirmation of step 512 is sent, the confirmation may be received by the initiator in step 506. The selector may use the IP address assigned by the initiator in step 514 to interact with the initiator. There is no need to check conflicts on the selector side since the selector was not already a member of a network when the connection was initiated. On the initiator side, the process may be complete in step 508 where the initiator may then interact with the selector.

Figure 6:
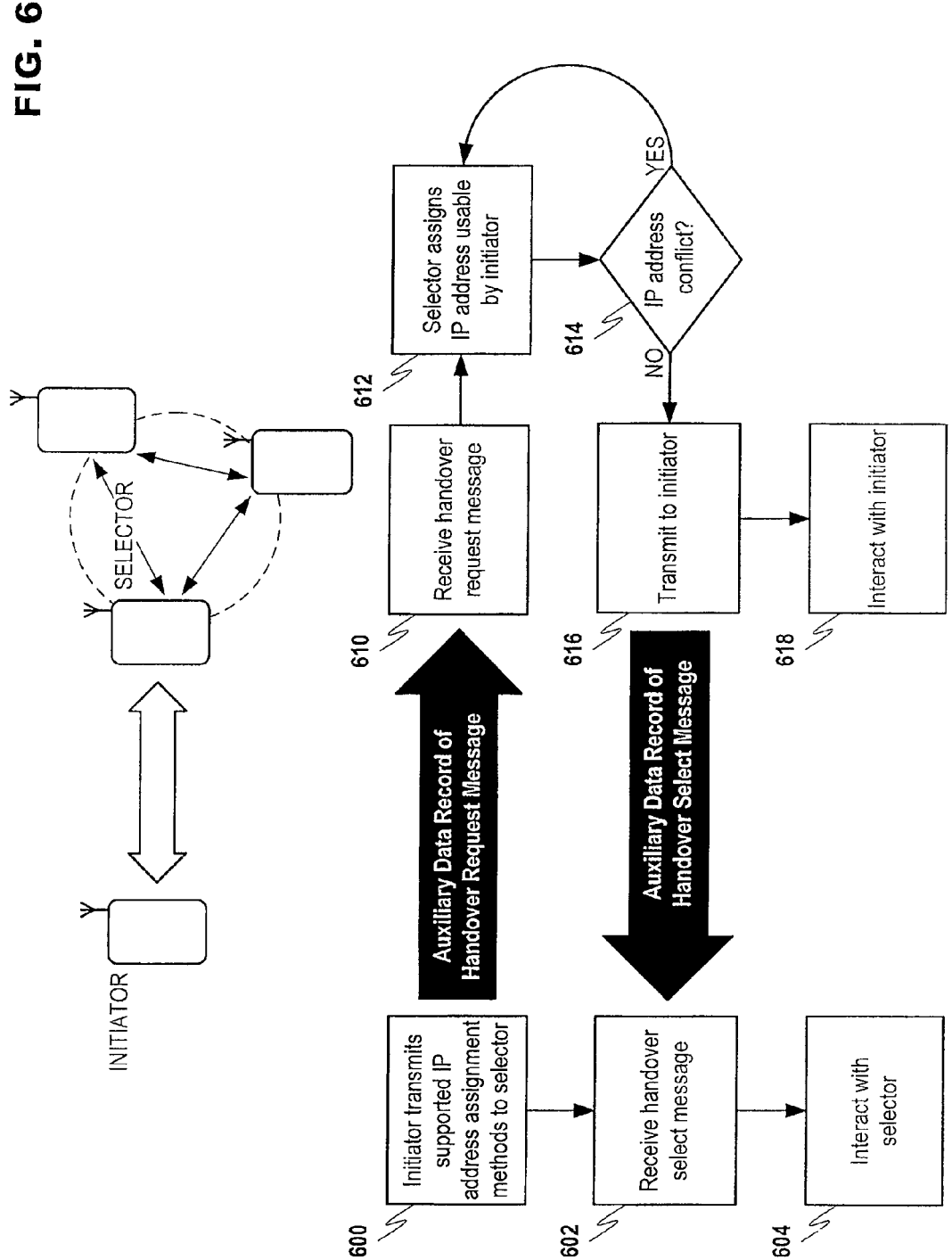
FIG. 6 discloses a third example apparatus interaction scenario in accordance with at least one embodiment of the present invention.
Figure 7:
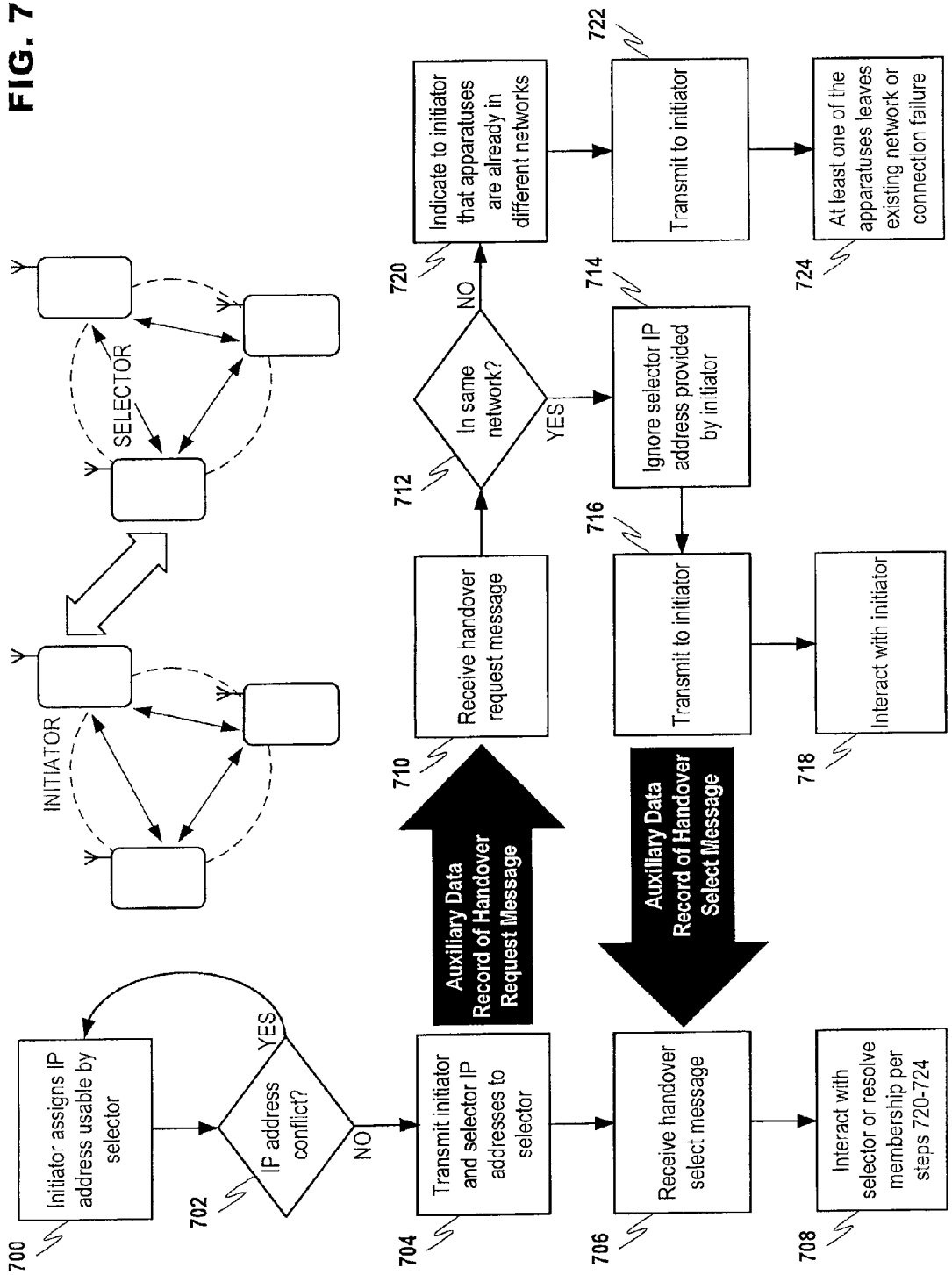
FIG. 7 discloses a fourth example apparatus interaction scenario in accordance with at least one embodiment of the present invention.

A third example scenario, in accordance with at least one embodiment of the present invention, is disclosed in FIG. 6, wherein the initiator is not member of ad hoc network and the selector is a member of an existing network. In step 600 the initiator may send one or more IP address assignment methods (e.g., the IP address assignment methods supported by the initiator) to the selector (e.g., within the auxiliary data record of a handover request message).

The selector may receive the handover request message in step 610 and in step 612 may assign an IP address for use by the initiator within the existing ad hoc network. Assigning a random link local IP address for the use by the initiator in step 612 implies that the selector is aware that its own address within the ad-hoc network is already allocated, and may simply comprise checking that the IP address assigned for the initiator is not already being used in the existing ad hoc network. In this instance there may not be enough time to perform ARP queries, without incurring noticeable delay, so as discussed above the selector may maintain a list of IP addresses prepared in advance. If no conflict is determined to exist in step 614, then in step 616 the selector may send a response to the initiator the auxiliary data record of a handover select message similar to the example set forth in FIG. 1. The initiator may receive the response in step 602 and may then interact with the selector in step 604 using the IP address received in the response. Likewise, the selector may interact with the initiator utilizing its already-assigned network address in step 618.

It is also foreseeable that the initiator and selector are both members of existing ad hoc networks. The example of FIG. 7 addresses this scenario, in accordance with at least one embodiment of the present invention. In step 700 the initiator may assign an IP address for use by the selector, keeping in mind its own IP address that is already allocated because the initiator is already member of an ad hoc network, and may check that the assigned address is not already in use within the ad hoc network of the initiator in step 702. The initiator may then send its own IP address, along with the IP address that it assigned for the selector, to the selector within the auxiliary data record of a handover request message in step 704.

The handover request message may then be received by the selector in step 712. If in step 712 the selector determines that the apparatuses are actually members of same ad hoc network, then in step 714 the selector may ignore the IP address assigned by initiator in step 700 (since both apparatuses are already assigned unique identifiers within the common network) and may transmit its own existing IP address within the auxiliary data record of a handover select message in step 716. The selector may then interact with the initiator using its own existing IP address in step 718, and the initiator, after receiving the handover request message from the selector in step 706, may interact with the selector using its own existing IP address in step 708.

If in step 712 it is determined that the apparatuses are not members of the same network, the process may proceed to step 720 where the selector may indicate this situation to the initiator through the transmission of a handover select message in step 722. The process may then enter a membership resolution phase in step 724 where at least one of the apparatuses must leave its existing network in order for the apparatuses to interact. If both apparatuses leave their networks, the apparatuses may reengage in connection establishment in the manner set forth in FIG. 4. If one if the apparatuses leaves its current network, then the apparatuses may reengage in connection establishment in the manner set forth in FIG. 5 or 6, depending on which apparatus elected to leave its respective network. If neither the initiator nor selector are willing (or able) to terminate its existing network membership, then connection establishment fails completely.

Figure 8:
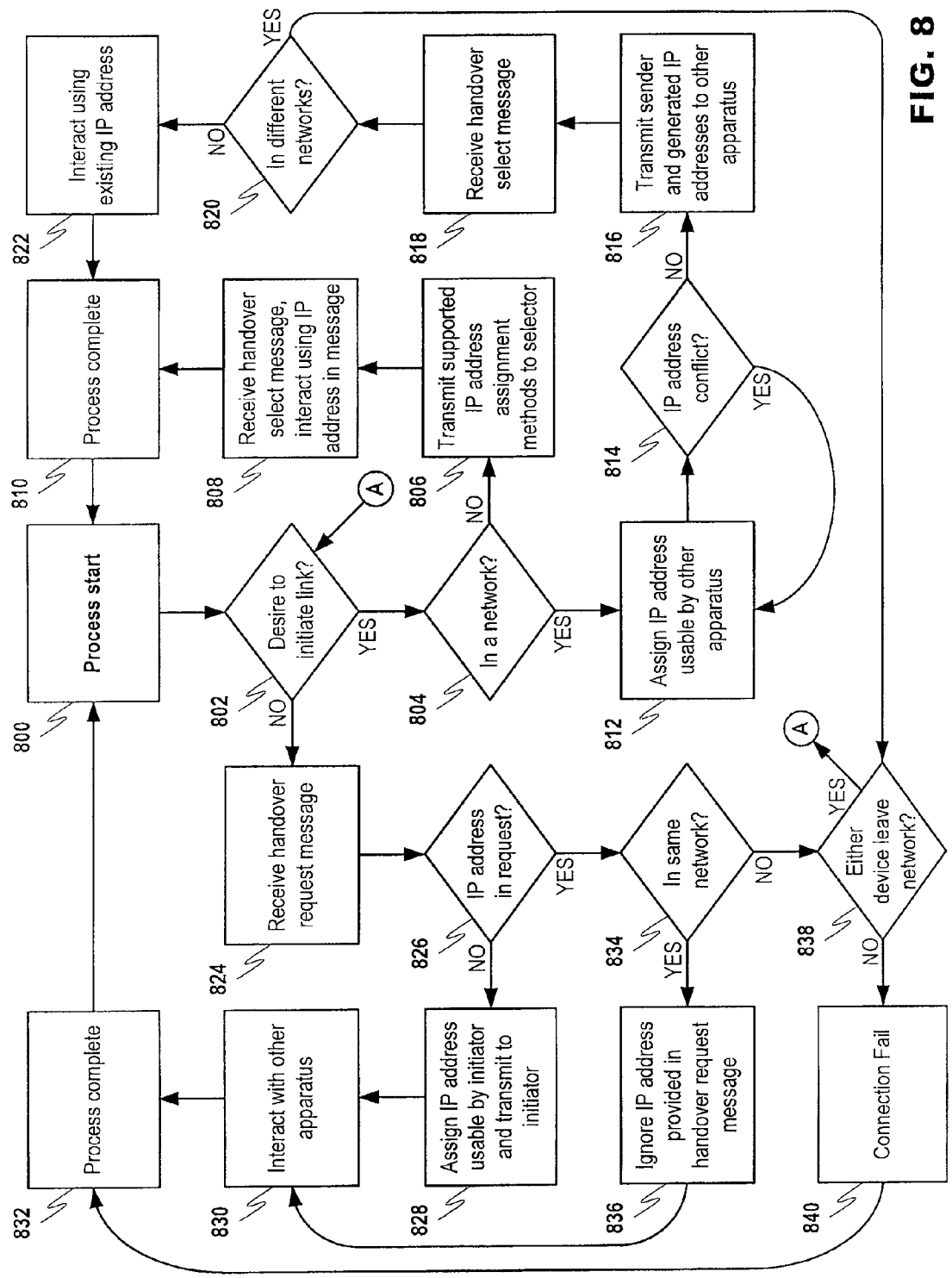
FIG. 8 discloses a flowchart of an example communication process in accordance with at least one embodiment of the present invention.

In accordance with at least one embodiment of the present invention, a flowchart of an example communication process from the perspective of a single apparatus is disclosed in FIG. 8. The process may begin in step 800 with a desire for communication. For example, a determination may be made in step 802 as to whether the apparatus desires to initiate a link to another apparatus. It is assumed in FIG. 8 that no handover request collisions occur, and thus, that if a determination is made in step 802 that the apparatus desires to initiate a link that it will act as an initiator, and that if it is determined that link initiation is not desired that the apparatus may await receipt of a handover request message (e.g., and act as a selector). If in step 802 the apparatus is determined to be acting as an initiator, in step 804 a further determination may be made as to whether the initiator is already a member of an existing network. If in step 804 a determination is made that the initiator is not already a member of an existing network, the process may proceed to step 806 where IP address configuration information may be sent to another apparatus. For example, the IP address configuration information may comprise one or more IP address assignment methods supported by the initiator, and may be sent in the auxiliary data record of a handover request message. A response message (e.g., a handover select message) may be received in step 808. The response message may comprise the address of the responder (e.g., the selector) along with an IP address assigned by the selector for use in interactions with this apparatus. The initiator may utilize the address provided by the selector in subsequent interactions. The process may terminate in step 810 and may reinitiate in step 800.

Returning to step 804, if it is determined that the initiator is already a member of an existing network, then in step 812 the initiator may assign a link local IP address usable by the selector. However, in this instance the initiator may first check for IP address conflicts with other apparatuses in the existing network in step 814 prior to transmitting any information to the selector in step 816. The verification may be performed based on IP address information already existing in the initiator, or by inquiring of other apparatuses in the network. In instances where the information is already in the initiator, the initiator may check the IP address against a list of IP addresses already in use in the network, may select an already verified IP address from a list of IP addresses maintained in the initiator, etc. Regardless of how the IP address is checked in step 814, new IP addresses may be assigned in step 812 until no conflicts are detected in step 814. At least the sender (initiator) address and the assigned address may then be transmitted to the selector in step 816, for example, in the auxiliary data record of a handover select message. In step 818 a response may be received from the selector. A further determination, based on the information received in the response, may then be made in step 820 as to whether the initiator and selector are members of the same network. If in step 820 it is determined that both the initiator and selector are members of an existing network, then in step 822 the initiator may interact with the selector using the IP address it already uses to interact on the existing network. The process may then terminate in step 810 and reinitiate in step 800. If it is determined in step 820 that the initiator and selector are already members of different existing networks, the process may then proceed to step 838 for a membership resolution phase, which will be discussed below.

Returning to step 802, if it is determined that the apparatus is not an initiator (e.g., the apparatus does not seek to initiate a connection to another apparatus), then the apparatus may be deemed a selector and the process may proceed to step 824 where a handover request message is received from an initiator. A determination may then be made in step 826 as to whether the handover request message includes an IP address. If it is determined that the handover request message does not include an IP address, then the initiator is not already operating in a network. The process may proceed to step 828 where the selector may assign an IP address for use by the initiator and may then transmit the assigned IP address the initiator in, for example, the auxiliary data record of a handover select message. The initiator and selector may then interact in step 830 using the IP address that was provided to the initiator by the selector, and the process may be complete in step 832 and may reinitiate in step 800. If in step 826 it is determined that the handover request message received in step 824 does contain an IP address, then in step 834 a further determination may be made as to whether both devices are members of the same network. If in step 834 it is determined that both devices are in the same network, then in step 836 any IP address provided by the initiator in the handover request message may be ignored by the selector (since both apparatuses already have unique identifiers within the same network). The selector and initiator may interact using their existing IP addresses in step 830, and the process may then be complete in 832 and may reinitiate in step 800. If in step 834 it is determined that the initiator and selector are not members of the same network, then the process may proceed to step 838.

The membership resolution phase may initiate in step 838 as a result of either a determination that the initiator and selector are already members in different networks either in step 820 or in step 834. Regardless of the origination point, in step 838 a determination may be made as to whether at least one of the initiator or selector is willing (or able) to sever its existing network membership in order to establish the desired connection. If either (or both) apparatuses are willing to leave its current network in step 838, then the process may return to step 802, as represented by on-screen jump reference "A," after the existing network membership has been terminated. However, If neither the initiator nor selector are willing (or able) to terminate its existing network membership, then connection establishment fails completely in step 840. The process may then be complete in step 832 and may reinitiate in step 800.

The various embodiments of the present invention are not limited only to the examples disclosed above, and may encompass other configurations or implementations.

For example, example embodiments of the present invention may encompass an apparatus comprising means for determining if the apparatus desires to initiate a connection to another apparatus; means for, if the apparatus is determined to be an initiator and is further determined not to be a member of an already existing network, the apparatus further comprising means for: transmitting IP address configuration information to the other apparatus; and setting an IP address in the apparatus based on information provided in a response received from the other apparatus.

At least one other example embodiment of the present invention may comprise electronic signals that cause an apparatus to determine if the apparatus desires to initiate a connection to another apparatus; if the apparatus is determined to be an initiator and is further determined not to be a member of an already existing network, the electronic signals further causing the apparatus to: transmit IP address configuration information to the other apparatus; and set an IP address in the apparatus based on information provided in a response received from the other apparatus.

At least one other example embodiment of the present invention may comprise a computer program product comprising computer readable program code recorded on a non-transitory computer readable storage medium is disclosed, the computer readable program code comprising: code configured to cause an apparatus to determine if the apparatus desires to initiate a connection to another apparatus; if the apparatus is determined to be an initiator and is further determined not to be a member of an already existing network, the code being further configured to cause the apparatus to: transmit IP address configuration information to the other apparatus; and set an IP address in the apparatus based on information provided in a response received from the other apparatus.

At least one other example embodiment of the present invention may comprise an apparatus comprising at least one processor; and at least one memory including executable instructions, the at least one memory and the executable instructions being configured to, in cooperation with the at least one processor, cause the apparatus to perform at least the following: determine if the apparatus desires to initiate a connection to another apparatus; if the apparatus is determined to be an initiator and is further determined not to be a member of an already existing network, the at least one memory and the executable instructions being further configured to, in cooperation with the at least one processor, cause the apparatus to: transmit IP address configuration information to the other apparatus; and set an IP address in the apparatus based on information provided in a response received from the other apparatus.

Accordingly, it will be apparent to persons skilled in the relevant art that various changes in forma and detail can be made therein without departing from the spirit and scope of The invention. The breadth and scope of the present invention should not be limited by any of the above-described example embodiments, but should be defined only in accordance with the following claims and their equivalents.

We claim:

1. A method, comprising:
   determining if an apparatus desires to initiate a wireless local area network connection to another apparatus;
   if the apparatus is determined not to be a member of an already existing wireless local area network, the apparatus further:
   transmitting, over a near field communication, IP address configuration information indicating at least one IP address assignment method supported by the apparatus to the other apparatus; and
   setting an IP address in the apparatus based on information received from the other apparatus via the near field communication as a response to the transmitted IP address configuration information.

2. The method of claim 1, wherein the information received from the other apparatus comprises at least an indication of an IP address assignment method selected by the other apparatus from the at least one IP address assignment method and an IP address usable for interacting with the other apparatus.

3. The method of claim 2, wherein the information received from the other apparatus further comprises one or more of the IP address of the other apparatus, a subnet mask and an available submask list.

4. The method of claim 1, further comprising: receiving a message in the apparatus and determining if the received message comprises an IP address provided by another apparatus for use by the apparatus.

5. The method of claim 4, wherein if it is determined that the received message does not comprise an IP address for use by the apparatus, assigning an IP address for use by the other apparatus and transmitting the assigned IP address to the other apparatus.

6. The method of claim 4, wherein if it is determined that the received message comprises an IP address for use by the apparatus, further determining if the apparatus and the other apparatus are in the same network, and if it is determined that the apparatus and the other apparatus are in the same network, disregarding the IP address received in the message.

7. A computer program product comprising computer executable program code recorded on a computer readable, non-transitory storage medium, the computer executable program code, when executed by a computer processor, comprising:
   code for determining if an apparatus desires to initiate a wireless local area network connection to another apparatus;
   code for transmitting, over a near field communication, IP address configuration information indicating at least one IP address assignment method supported by the apparatus to the other apparatus if the apparatus is determined not to be a member of an already existing wireless local area network; and
   code for setting an IP address in the apparatus based on information received from the other apparatus via the near field communication as a response to the transmitted IP address configuration information.

8. The computer program product of claim 7, wherein the information received from the other apparatus comprises at least an indication of an IP address assignment method selected by the other apparatus from the at least one IP address assignment method and an IP address usable for interacting with the other apparatus.

9. The computer program product of claim 8, wherein the information received from the other apparatus further comprises one or more of the IP address of the other apparatus, a subnet mask and an available submask list.

10. The computer program product of claim 7, further comprising: code for receiving a message in the apparatus and determining if the received message comprises an IP address provided by another apparatus for use by the apparatus.

11. The computer program product of claim 10, wherein if it is determined that the received message does not comprise an IP address for use by the apparatus, assigning an IP address for use by the other apparatus and transmitting the assigned IP address to the other apparatus.

12. The computer program product of claim 10, wherein if it is determined that the received message comprises an IP address for use by the apparatus, further determining if the apparatus and the other apparatus are in the same network, and if it is determined that the apparatus and the other apparatus are in the same network, disregarding the IP address received in the message.

13. An apparatus comprising:
   at least one processor;
   at least one memory including computer program code;
   the at least one memory and the computer program code configured to, with the at least one processor, cause the apparatus at least to:
   determine if an apparatus desires to initiate a wireless local area network connection to another apparatus;
   if the apparatus is determined not to be a member of an already existing wireless local area network, the at least one memory and the computer program code further configured to, with the at least one processor, cause the apparatus to:
   transmit, over a near field communication., IP address configuration information indicating at least one IP address assignment method supported by the apparatus to the other apparatus; and
   set an IP address in the apparatus based on information received from the other apparatus via the near field communication as a response to the transmitted IP address configuration information.

14. The apparatus of claim 13, wherein the information received from the other apparatus comprises at least an indication of an IP address assignment method selected by the other apparatus from the at least one IP address assignment method and an IP address usable for interacting with the other apparatus.

15. The apparatus of claim 14, wherein the information received from the other apparatus further comprises one or more of the IP address of the other apparatus, a subnet mask and an available submask list.

16. The apparatus of claim 13, wherein the at least one memory and the computer program code are further configured to, with the at least one processor, cause the apparatus to receive a message and determine if the received message comprises an IP address provided by another apparatus for use by the apparatus.

17. The apparatus of claim 16, wherein the at least one memory and the computer program code are further configured to, with the at least one processor, cause the apparatus to assign an IP address for use by the other apparatus and transmit the assigned IP address to the other apparatus if it is determined that the received message does not comprise an IP address for use by the apparatus.

18. The apparatus of claim 16, wherein the at least one memory and the computer program code are further configured to, with the at least one processor, cause the apparatus to further determine if the apparatus and the other apparatus are in the same network, and if it is determined that the apparatus and the other apparatus are in the same network, disregard the IP address received in the message.

* * * * *